United States Patent
Lee et al.

(10) Patent No.: US 10,640,610 B2
(45) Date of Patent: May 5, 2020

(54) ORGANOZINC-SUPPORTED CATALYST, METHOD FOR PRODUCING THE SAME, AND METHOD FOR PREPARING POLYALKYLENE CARBONATE RESIN USING CATALYST

(71) Applicant: LG CHEM, LTD., Seoul (KR)

(72) Inventors: Jun Wye Lee, Daejeon (KR); Il Ha Lee, Daejeon (KR); Seung Young Park, Daejeon (KR); Ki-Hwan Kim, Daejeon (KR); Sung-Kyoung Kim, Daejeon (KR)

(73) Assignee: LG CHEM LTD., Seoul (KR)

( * ) Notice: Subject to any disclaimer, the term of this patent is extended or adjusted under 35 U.S.C. 154(b) by 0 days.

(21) Appl. No.: 15/768,319

(22) PCT Filed: Mar. 17, 2017

(86) PCT No.: PCT/KR2017/002916
§ 371 (c)(1),
(2) Date: Apr. 13, 2018

(87) PCT Pub. No.: WO2017/164577
PCT Pub. Date: Sep. 28, 2017

(65) Prior Publication Data
US 2019/0010283 A1    Jan. 10, 2019

(30) Foreign Application Priority Data

Mar. 24, 2016  (KR) .................. 10-2016-0035411

(51) Int. Cl.
*C08G 64/34* (2006.01)
*B01J 31/12* (2006.01)
(Continued)

(52) U.S. Cl.
CPC .............. *C08G 64/34* (2013.01); *B01J 23/06* (2013.01); *B01J 31/12* (2013.01); *B01J 35/02* (2013.01); *C07F 3/06* (2013.01); *C08G 64/20* (2013.01)

(58) Field of Classification Search
CPC ....... C08G 64/34; C08G 64/0208; C07F 3/06; C07C 51/412; C07C 55/18; C07C 55/12
See application file for complete search history.

(56) References Cited

U.S. PATENT DOCUMENTS

2003/0134740 A1   7/2003   Meng et al.
2012/0123066 A1   5/2012   Fujimoto et al.
(Continued)

FOREIGN PATENT DOCUMENTS

EP    2 711 385 A1   3/2014
JP    5697595 B2     4/2015
(Continued)

OTHER PUBLICATIONS

Soga, et al.: "Alternating Copolymerization of CO2 and Propylene Oxide with the Catalysts Prepared from Zn(OH)2 and Various Dicarboxylic Acids", XP000601418, Polymer Journal, Society of Polymer Science, Tokyo, JP, vol. 13, No. 4, Jan. 1, 1981, pp. 407-410.
(Continued)

*Primary Examiner* — Shane Fang
(74) *Attorney, Agent, or Firm* — Dentons US LLP (57) ABSTRACT

The present invention relates to an organozinc-supported catalyst, a method for producing the same, and a method for preparing a polyalkylene carbonate resin using the catalyst. The organozinc-supported catalyst provided by the present invention includes a zinc dicarboxylate-based catalyst supported on a zinc compound layer formed on at least a portion of a support surface, and can be used repeatedly or continu-
(Continued)

ously while exhibiting improved selectivity in the polymerization process for preparing a polyalkylene carbonate resin.

19 Claims, 5 Drawing Sheets

(51) Int. Cl.
*B01J 23/06* (2006.01)
*C07F 3/06* (2006.01)
*B01J 35/02* (2006.01)
*C08G 64/20* (2006.01)

(56) References Cited

U.S. PATENT DOCUMENTS

2014/0200328 A1 7/2014 Brym et al.
2017/0029563 A1 2/2017 Kang et al.

FOREIGN PATENT DOCUMENTS

KR   10-2014-0062130 A    5/2014
KR   10-2015-0143342 A   12/2015

OTHER PUBLICATIONS

Gao, et al.: "Silica-supported zinc glutarate catalyst synthesized by rheological phase reaction used in the copolymerization of carbon dioxide and propylene oxide", Journal of Polymer Research, vol. 22: 220, Oct. 26, 2015, pp. 1-7.
Koinuma, et al.; "Vacuum and Pressured Combinatorial Processings for Exploration of Environmental Catalysts"; Topics in Catalysis, vol. 53, No. 1-2, pp. 35-39; 2010.

ORGANOZINC-SUPPORTED CATALYST, METHOD FOR PRODUCING THE SAME, AND METHOD FOR PREPARING POLYALKYLENE CARBONATE RESIN USING CATALYST

TECHNICAL FIELD

Cross-Reference to Related Applications

This application is a National Stage Application of International Application No. PCT/KR2017/002916, filed on Mar. 17, 2017, which claims the benefit of Korean Patent Application No. 10-2016-0035411, filed on Mar. 24, 2016, all of which are hereby incorporated by reference in their entirety for all purposes as if fully set forth herein.

TECHNICAL FIELD

The present invention relates to an organozinc-supported catalyst capable of being used repeatedly or continuously while exhibiting improved selectivity in a polymerization process for preparing a polyalkylene carbonate resin, a method for producing the organozinc-supported catalyst, and a method for preparing a polyalkylene carbonate resin using the organozinc-supported catalyst.

BACKGROUND ART

A polyalkylene carbonate is an amorphous transparent resin, and has only an aliphatic structure, unlike an aromatic carbonate which is a similar engineering plastic, and is synthesized by a copolymerization reaction under a catalyst by using carbon dioxide and an epoxide as a monomer. Such a polyalkylene carbonate is advantageous in being excellent in transparency, elongation and oxygen blocking properties, exhibiting biodegradation, and being completely decomposed into carbon dioxide and water during burning, thus leaving no carbon residue.

Accordingly, various catalysts are being studied and suggested in order to produce such a polyalkylene carbonate resin. As a typical catalyst, there has been known a zinc dicarboxylate-based catalyst such as a glutarate catalyst in which zinc and a dicarboxylic acid are bonded.

Such a zinc dicarboxylate-based catalyst is produced in the form of a nanometer scale powder by reacting a zinc precursor with the dicarboxylic acid, and the powdery catalyst forms an agglomerate having a considerable size, so that the surface area thereof is reduced in the production of the polyalkylene carbonate resin, and the catalyst activation may be lowered.

In addition, the conventionally known zinc dicarboxylate-based catalyst has a selectivity of 95% for a polyalkylene carbonate polymerization product, and when the polymerization is performed using the catalyst, a by-product such as alkylene carbonate in addition to the polyalkylene carbonate is generated. For this reason, an additional process is required in order to remove the by-product after polymerization.

In addition, the conventional zinc dicarboxylate-based catalyst causes depolymerization of the polyalkylene carbonate resin polymerized by a backbiting reaction, so that it is necessary for the catalyst to be removed from the resin after completion of the polymerization. From this reason, a method in which an additional flocculant is added, and then physically removed by using a filter or chemically removed by using an ion exchange resin may be used. However, the removal of the zinc dicarboxylate-based catalyst using these methods requires a method in which an additional solvent is added to lower a viscosity, and then the catalyst is removed, followed by removing the solvent, so that a large amount of energy may be consumed, and the catalyst used in polymerization may be difficult to be reused.

Due to this, there is being continuously required a zinc dicarboxylate-based catalyst which may be capable of being used repeatedly or continuously by having a large reaction surface area and a high selectivity to the polymerization reaction product and being easily recoverable.

DISCLOSURE OF THE INVENTION

Technical Problem

An aspect of the present invention provides an organozinc-supported catalyst which may be used repeatedly or continuously while exhibiting improved selectivity to a product in the polymerization process for preparing a polyalkylene carbonate resin, and a method for producing the organozinc-supported catalyst.

Another aspect of the present invention provides a method for preparing a polyalkylene carbonate resin using the organozinc-supported catalyst.

Technical Solution

According to an aspect of the present invention, there is provided an organozinc-supported catalyst including a support; a zinc compound layer formed on at least a portion of the support surface; a zinc dicarboxylate-based catalyst supported on the zinc compound layer.

According to another aspect of the present invention, there is provided a method for preparing an organozinc-supported catalyst including the steps of treating a support to zinc oxide to form a zinc compound layer on at least a portion of the support surface; and reacting the zinc compound with a dicarboxylic acid to support a zinc dicarboxylate-based catalyst on the zinc compound layer.

Also, according to another aspect of the present invention, there is provided a method for producing a polyalkylene carbonate resin including the step of polymerizing a monomer including an epoxide and carbon dioxide in the presence of the organozinc-supported catalyst.

Hereinafter, an organozinc-supported catalyst according to embodiments of the present invention, a method for producing the same, and a method for preparing a polyalkylene carbonate resin using the organozinc-supported catalyst will be described in detail.

Before describing the entire specification, it is to be understood that the terminology is for the purpose of describing particular embodiments only and is not intended to limit the invention. Also, the singular forms used herein include plural forms unless the phrases expressly have the opposite meaning. Further, as used herein, the term 'comprising' embodies certain features, areas, integers, steps, operations, elements and/or components, and it does not exclude the presence or addition of other specified features, regions, integers, steps, operations, elements, components, and/or groups.

Organozinc-Supported Catalyst

According to an embodiment of the present invention, there is provided an organozinc-supported catalyst including a support; a zinc compound layer formed on at least a portion of the support surface; and a zinc dicarboxylate-based catalyst supported on the zinc compound layer.

Here, the term "supported catalyst" may comprehensively refer to a catalyst produced such that a catalyst having activity to a desired chemical reaction may be immobilized to a carrier having inertness and thus may raise the activity of the catalyst or obtain additional advantages. In this case, the catalyst may chemically or physically be immobilized on the surface or inside the pores of the carrier. Therefore, the term "organozinc-supported catalyst" may refer to a catalyst in which an organozinc catalyst such as a zinc dicarboxylate-based catalyst having activity in the preparation of a polyalkylene carbonate resin is present by being immobilized by a chemical bond such as a covalent bond or a coordination bond to the inside or the surface of a zinc compound layer, or by a physical force, such as adhesion, attachment or adsorption, or in which at least partially is buried.

Meanwhile, a conventional organozinc catalyst is a single material in the form of an agglomerated powder having a metal-organic framework (MOF) without use of the support, and the size of the single particle thereof is several tens of nanometers to several micrometers, but usually agglomerates to form an agglomerate having several hundreds of nanometers to several hundreds of micrometers in size.

Therefore, the activity is restricted only to the catalyst positioned mainly on the outer side of the catalytic agglomerate, and thus the activity and selectivity for synthesis are also low. From this reason, there are required a large amount of additional catalyst added for obtaining the desired activity and an additional process for removing the large amount of catalyst having been used.

Thus, as a result of the continuous study of the present inventors, it was ascertained that a zinc compound layer was formed by using the zinc compound commonly used as a zinc precursor on the support surface, and when a dicarboxylate-based catalyst is produced by a direct reaction with a dicarboxylic acid on the zinc compound layer, the zinc dicarboxylate-based catalyst is supported on the zinc compound layer and may have a wide reaction area without agglomeration unlike the conventional zinc catalyst.

In particular, such organozinc-supported catalysts do not agglomerate one another, most of the catalysts exposed on the surface may be involved in the polymerization reaction, and the selectivity to the polymerization reaction product is high, so that the by-product removal process may not be required. Further, the organozinc-supported catalyst may be produced in various forms depending on the type and shape of the support, and may be used in various types of polymerization processes.

Furthermore, the organozinc-supported catalyst supports most of the catalysts without any change even after use, and thus may be reused repeatedly and also used in the continuous reaction. Further, there is no fear of depolymerization, and the removal process is not required after polymerization, so that the organozinc-supported catalyst may be very efficiently applied to the production of a polyalkylene carbonate resin by a reaction of carbon dioxide with an epoxide.

The support may have a one-dimensional needle-like shape, a two-dimensional plate-like shape, or a three dimensional spherical shape. The support may use a material having a suitable shape and size depending on the form of the reaction to be used.

Specifically, as the support, any material in which a zinc compound may be fixed, and exhibit inertness during the polymerization reaction may be used without any limitation to an organic material or an inorganic material.

For example, the support may be at least one inorganic material selected from the group consisting of silicon dioxide ($SiO_2$), zirconium oxide ($ZrO_2$), aluminum oxide ($Al_2O_3$), magnesium chloride ($MgCl_2$), calcium chloride ($CaCl_2$), magnesium oxide (MgO), titanium oxide ($TiO_2$), boron oxide ($B_2O_3$), calcium oxide (CaO), barium oxide (BaO), thorium oxide ($ThO_2$), stainless steel, and silicon carbide (SiC).

Meanwhile, a zinc compound layer may be formed on at least a portion of the surface of the support by the production method to be described later. Preferably, a zinc compound layer is formed on the entirety of the surface of the support to increase the surface area of the catalyst to be supported on the zinc compound layer.

As such a zinc compound, any zinc precursor used from before in the production of a zinc dicarboxylate-based catalyst may all be used without any limitation. Specifically, the zinc compound may be at least one compound selected from the group consisting of zinc oxide (ZnO), zinc sulfate ($ZnSO_4$), zinc chlorate ($Zn(ClO_3)_2$), zinc nitrate ($Zn(NO_3)_2$), zinc acetate ($Zn(OAc)_2$) and zinc hydroxide ($Zn(OH)_2$). Among them, zinc oxide (ZnO) may be suitable as a zinc compound from the viewpoint of ease of catalyst production.

The zinc compound layer may have a thickness of 10 to 1000 nm, specifically 100 to 800 nm, or more specifically 100 to 600 nm. When the thickness of the zinc compound layer is in the above range, the zinc dicarboxylate-based catalyst may be effectively supported. When the thickness of the zinc compound layer is thinner than 10 nm, a sufficient amount of the supported catalyst is difficult to be produced due to insufficient reaction with the dicarboxylic acid, and when the thickness of the zinc compound layer is thicker than 1000 nm, it is inefficient in view of cost.

In this case, the structure and shape of the zinc compound layer may become different by changing the kind of the substrate, the deposition method or deposition material of the zinc compound, or the like in the production method to be described later.

As an example, the zinc compound layer may have a structure in which a plurality of zinc compounds are clustered, and may specifically have a structure in which the zinc compounds in the form of a nano-rod, a nano-hair, a nano-fiber, a nano-pillar, or a nano-wire are clustered. The shape of the zinc compound may be checked by observing a longitudinal cross section of the support on which the zinc compound layer is formed with an analyzer such as a scanning electron microscope (SEM). Accordingly, the zinc compound layer has both a protrusion portion and a depression portion, so that the supporting efficiency of the catalyst may be higher than in the case of having a flat surface.

On the other hand, the zinc dicarboxylate-based catalyst may be obtained by reacting the zinc compound with a dicarboxylic acid having 3 to 20 carbon atoms. Specifically, the zinc dicarboxylate-based catalyst may be obtained by reacting a dicarboxylic acid with a zinc compound constituting the zinc compound layer, and may be specifically obtained by the production method to be described later. The zinc compound reacts and the dicarboxylic acid chemically react with each other to generate a zinc dicarboxylate-based catalyst, so that the zinc dicarboxylate-based catalyst may be supported on the zinc compound layer without a separate process for supporting the catalyst. That is, the zinc dicarboxylate-based catalyst may be supported by reacting the zinc compound with the dicarboxylic acid. Accordingly, the zinc dicarboxylate-based catalyst may be chemically or physically bonded on the zin compound layer.

In this case, the reaction of the zinc compound and the dicarboxylic acid may be performed on the surface of the zinc compound layer. Accordingly, the zinc dicarboxylate-based catalyst may be supported in a flake shape on the surface of the zinc compound layer. The zinc carboxylate-based catalyst is supported with a flake shape like a thinly sliced piece, so that unlike a conventional catalyst in the form of powder, an agglomeration phenomenon between catalysts is remarkably reduced, and the decrease in catalyst activation due to the reduction of the surface area may be minimized.

Such a zinc dicarboxylate-based catalyst forms a thin film having a thickness of 10 to 500 nm, and is supported on the surface of the zinc compound layer.

In addition, the dicarboxylic acid reacting with the zinc precursor may use any dicarboxylic acid having 3 to 20 carbon atoms. Specifically, the dicarboxylic acid may be an aliphatic dicarboxylic acid selected from the group consisting of malonic acid, glutaric acid, succinic acid, and adipic acid; an aromatic dicarboxylic acid selected from the group consisting of terephthalic acid, isophthalic acid, homophthalic acid, and phenylglutaric acid; or a mixture thereof. In addition, the dicarboxylic acid may be any of various aliphatic or aromatic dicarboxylic acids having 3 to 20 carbon atoms.

Therefore, the zinc dicarboxylate-based catalyst may be at least one selected from the group consisting of a zinc malonate-based catalyst, a zinc glutarate-based catalyst, a zinc succinate-based catalyst, a zinc adipate-based catalyst, a zinc terephthalate-based catalyst, a zinc isophthalate-based catalyst, a zinc homophthalate-based catalyst, and a zinc phenyl glutarate-based catalyst. However, in view of the activity or the like of the organozinc catalyst, glutaric acid may be used as the dicarboxylic acid and a zinc glutarate-based catalyst is suitable as the zinc dicarboxylate-based catalyst.

As previously described above, in the organozinc-supported catalyst according to one embodiment, the catalyst is fixed to the support having a specific shape and size and the zinc compound layer formed on the surface of the support, so that the original shape may be maintained without being detached from the zinc compound layer even after the polymerization reaction for preparing a polyalkylene carbonate resin is completed. Further, unlike the conventional powdery organozinc catalyst, which is present in the polymer solution without any change after polymerization and has to be necessarily separated from the polymer solution, the organozinc-supported catalyst is present only in a very small amount in the solution during polymerization, so that no additional process for removing the catalyst from the solution may be required, and most of the added catalyst may be also recovered. As a result, the organozinc-supported catalyst according to one embodiment may be used repeatedly three or more times.

Method for Preparing Organozinc-Supported Catalyst

On the other hand, according to another embodiment, there is provided a method for producing a organozinc-supported catalyst, the method including the steps of treating a zinc compound to a support to form a zinc compound layer on at least a portion of the support surface; and reacting the zinc compound with a dicarboxylic acid to support a zinc dicarboxylate-based catalyst on the zinc compound layer.

The matters concerning the support, the zinc compound, the dicarboxylic acid, and the zinc compound layer in the production method will be referred to the above-described contents.

Figure 1:
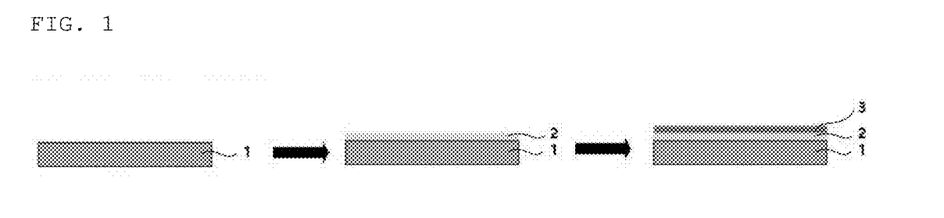
FIG. 1 is a schematic diagram showing a method for producing an organozinc-supported catalyst according to one embodiment.

FIG. 1 is a schematic diagram illustrating a method for preparing an organozinc-supported catalyst of one embodiment.

Hereinafter, the method for preparing an organozinc-supported catalyst of one embodiment will be described with reference to FIG. 1.

First, the step of treating a zinc compound to a support 1 to form a zinc compound layer 2 on at least a portion of the surface of the support 1 or preferably on the entire surface of the support 1 is carried out.

In this case, the treatment of the zinc compound may be carried out by appropriately using methods generally known as a coating method such as a deposition method, a spin coating method, a spray method, an inkjet printer method, a dipping method, a casting method, a gravure coating method, a bar coating method, or a roll coating method, depending on the kind of the support and the zinc compound, but is not limited to the above-described examples.

Specifically, the treatment of the zinc compound may be carried out by a method for depositing a zinc compound on the surface of the support 1.

For example, physical vapor deposition (PVD) or chemical vapor deposition (CVD) may be used as the method of deposition to be used.

The physical vapor deposition method may use sputtering deposition, thermal evaporation deposition, or ion-beam assisted deposition or the like, and the chemical vapor deposition method may use atmospheric pressure chemical vapor deposition (APCVD), low pressure CVD (LPCVD), plasma enhanced CVD (PECVD), aerosol assisted CVD (AACVD), atomic Layer CVD (ALCVD), or the like. Among them, the sputtering deposition method may be carried out even at a low temperature, so that it may be desirable in that the method may be applied to various supports and requires no specific chemical reaction.

The treatment of the zinc compound may be performed by the above-described method such that the zinc compound layer 2 has a thickness of 10 nm to 1000 nm. In this case, while a reaction of the zinc compound with the dicarboxylic acid is performed smoothly, the zinc dicarboxylate-based catalyst generated by the reaction may be effectively supported on the zinc compound layer 2. When the thickness of the zinc compound layer is within the above-described range, the cost is efficient, and the reaction with the dicarboxylic acid may be also performed sufficiently.

Next, there are carried out the steps of reacting a zinc compound in the formed zinc compound layer 2 with a dicarboxylic acid having 3 to 20 carbon atoms to synthesize zinc dicarboxylate-based catalysts, and at the same time, supporting the synthesized zinc carboxylate-based catalysts 3 on the zinc compound layer.

In this case, the reaction of the zinc compound with the dicarboxylic acid may be performed in the presence of a solvent capable of uniformly dispersing or dissolving the dicarboxylic acid, and any method capable of sufficiently contacting the zinc compound layer 2 with the dicarboxylic acid in the solvent may be used without any particular limitation. For example, after the solvent and the dicarboxylic acid are added to a reactor capable of stirring, the support 1 on which the zinc compound layer 2 is formed is fixed and the reaction may be performed with stirring. Otherwise, after the support 1 on which the zinc compound layer 2 is formed is added or fixed in a bed type reactor, the solvent and the dicarboxylic acid may be circulated to perform the reaction.

In this case, as the solvent, any organic or aqueous solvent known to be capable of uniformly dispersing or dissolving the dicarboxylic acid may be used. Specific examples of the solvent may include at least one solvent selected from the group consisting of toluene, hexane, dimethylformamide, acetone, methanol, ethanol and water.

The solvent is preferable to be added in such an appropriate amount that the support 1 on which the zinc compound layer 2 is formed may be sufficiently immersed. In this case, the solvent may be added in an amount of 2 to 1000 mol relative to 1 mole of the dicarboxylic acid. Specifically, the solvent may be added in an amount of 5 to 100 mol, or 10 to 50 mol, relative to 1 mole of the dicarboxylic acid. In the above range, the dicarboxylic acid is appropriately dispersed in the solvent, and thus the catalyst synthesis reaction may be performed effectively.

In addition, the reaction of the zinc compound with the dicarboxylic acid may be performed for about 1 hour to 48 hours at a temperature of about 40 to 130° C. As a specific example, in the presence of the solvent, the reaction may be performed for about 1 hour to 24 hours at a temperature of about 40 to 80° C., and then additionally performed for about 1 hour to 24 hours at a temperature of about 80 to 130° C. By controlling such a reaction temperature, time, or the like, there may be produced a supported catalyst of one embodiment in which the zinc dicarboxylate-based catalyst having a uniform shape is uniformly supported on the zinc compound layer.

The reaction of the zinc compound and the dicarboxylic acid may be performed on the surface of the zinc compound layer 2. Specifically, the reaction may be performed on a surface portion, which means the thickness point from the outer surface facing the support 1 in the zinc compound layer 2 to 10 to 500 nm in the inward direction, and the degree of the reaction thereof may be proportional to the reaction time and the amount of dicarboxylic acid to be added.

Accordingly, as the reaction of the zinc compound with the dicarboxylic acid is performed on the surface portion having a thickness of 10 to 500 nm of the zinc compound layer 2, the zinc dicarboxylate-based catalyst synthesized by the reaction may be supported while forming a structure in the form of a thin film on the surface portion of the zinc compound layer. As a result, most of the supported zinc dicarboxylate-based catalysts is exposed to the polymerization reaction of polyalkylene carbonate, so that the catalytic activity may be improved.

On the other hand, the method for producing an organozinc-supported catalyst of one embodiment may further include the steps of washing and drying the support 1 in which a zinc dicarboxylate-based catalyst 3 is supported on the zinc compound layer 2.

The washing step may be repeated several times until no unreacted reactant is remained by using the solvent capable of being used in the above-described reaction. Further, the drying step may be performed by vacuum drying at a temperature of about 40 to 200° C.

Method for Preparing Polyalkylene Carbonate Resin

On the other hand, according to another embodiment of the present invention, there is provided a method for preparing a polyalkylene carbonate resin including the step of polymerizing a monomer including an epoxide and carbon dioxide in the presence of the above-described organozinc-supported catalyst.

In the method for preparing such a resin, the organozinc-supported catalyst may be used as a heterogeneous catalyst, and the polymerization step may be performed by solution polymerization in an organic solution. That is, the polymerization step may be performed by the solution polymerization capable of continuously contacting the organozinc-supported catalyst with a reaction mixture including an epoxide, carbon dioxide, and a solvent. As a result, the heat of the reaction may be appropriately controlled, and the molecular weight or viscosity of the polyalkylene carbonate resin to be obtained may be controlled easily.

Figure 2:
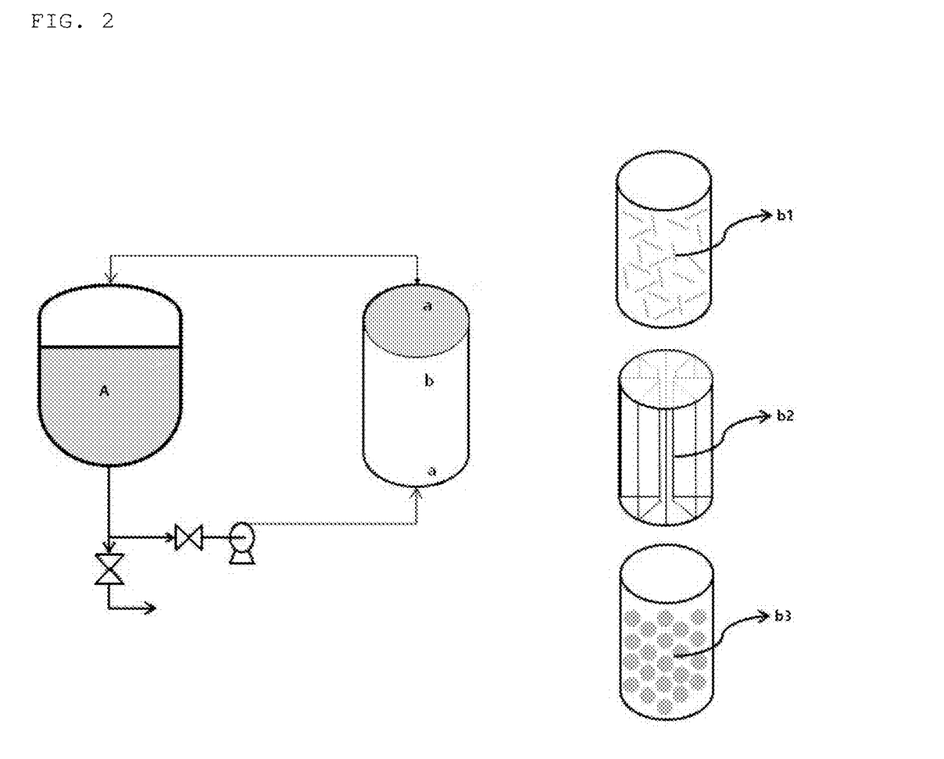
FIG. 2 is a schematic diagram of a solution polymerization system for preparing a polyalkylene carbonate resin according to one embodiment.

FIG. 2 is a schematic diagram of a solution polymerization system for preparing a polyalkylene carbonate resin of one embodiment.

Referring to FIG. 2, the solution polymerization may be performed by using a bed-type catalyst reactor and a monomer circulation system.

Specifically, the solution polymerization may be performed in a system configured such that the monomer or the solvent are polymerized while circulating the catalyst reactor or stirring therein. In this case, the organozinc-supported catalyst (b) may be filled inside the catalyst reactor (A), and a filter (a) having pores smaller in size than the supported catalyst is mounted on the upper and lower portions of the catalyst reactor (A). Therefore, the monomer including an epoxide and carbon dioxide in the organic solvent may be polymerized on the supported catalyst (b), and such polymerization product is dissolved in the organic solvent, passed through the filter (a), and may be polymerized while continuously circulating. In this case, the size of the filter (a) is smaller than that of the supported catalyst (b), so that the supported catalyst does not move with the polymerization product.

The polymerization of the supported catalyst includes a supported catalyst fixed to at least a portion of the inside of the reactor regardless of the type or kind of the reactor, and may be performed by appropriately using the generally known methods which may provide a fluid situation capable of continuous contact between the fixed supported catalyst, the solvent, and the monomer, and is not limited to the above-described examples.

In addition, as the organozinc-supported catalyst (b), a supported catalyst of a needle-like shape (b1), a plate-like shape (b2), or a spherical shape (b3) may be used depending on the shape of the support. Accordingly, various methods of the polymerization processes may be possible by varying the shape of the supported catalyst.

As a result, by the solution polymerization, the polyalkylene carbonate generated on the surface of the supported catalyst is dissolved in a surrounding solvent and moves to a solution phase, so that the surface portion of the supported catalyst, which is an active portion, may be kept exposed at all times without mixing with the product. This is in contrast to a conventional polymerization method in which the catalyst is physically attached into the generated polymer so that the activity may not be sufficiently realized when the catalyst is reused after being recovered. Thus, in the case of using a certain amount of the organozinc-supported catalyst according to one embodiment, the catalyst may be continuously used.

In such a solution polymerization, the solvent may use at least one selected from the group consisting of dichloromethane, ethylene dichloride, trichloroethane, tetrachloroethane, chloroform, acetonitrile, propionitrile, dimethylformamide, N-methyl-2-pyrrolidone, dimethylsulfoxide, nitromethane, 1,4-dioxane, hexane, toluene, tetrahydrofuran, methylethyl ketone, methylamine ketone, methyl isobutyl ketone, acetone, cyclohexanone, trichloroethylene, methyl acetate, vinyl acetate, ethyl acetate, propyl acetate butylolactone, caprolactone, nitropropane, benzene, styrene, xylene, and methyl propasol. Among them, by using a chlorinated solvent such as dichloromethane, ethylene dichloride, trichloroethane, tetrachloroethane, or chloroform, the polymerization reaction may be further effectively carried out.

The amount of a reaction mixture in which the solvent, epoxide and carbon dioxide added during the polymerization are mixed has to be such an amount or more that the organozinc-supported catalyst inside the reactor or the catalyst reactor may be at least immersed in the reaction mixture during the polymerization process. When the supported catalyst is not immersed in the reaction mixture during the polymerization process, a catalyst active site may not contact the monomer sufficiently, and polymerization at a desired level may be difficult to be performed.

The solvent may be used at a weight of about 0.1 to 100 times, based on the weight of the epoxide in the reaction mixture such that the above conditions are satisfied, and appropriately, may be used at a weight of about 0.5 to 50 times. In this case, when the solvent is used at a weight of less than 0.1 times, the solvent may not properly act as a reaction medium, so that advantages of the above-described solution polymerization may be difficult to exhibit. In addition, when the solvent is used at a weight of more than 100 times, the concentration of epoxide or the like may be relatively lowered, so that productivity may be deteriorated, and the molecular weight of the finally formed resin may be lowered, or side reactions may be increased.

In addition, the carbon dioxide may be added in an amount of about 1 to 10 mol, based on 1 mol of the epoxide in the reaction mixture. More preferably, the carbon dioxide may be added in an amount of about 2 to 5 mol based on q mol of the epoxide. When the carbon dioxide is used at less than 1 mol, the amount of polyalkylene glycol in the by-product tends to increase; when the carbon dioxide is used at more than 10 mol, it is not effective due to excessive addition of monomers.

On the other hand, as the epoxide, at least one selected from the group consisting of an alkylene oxide having 2 to 20 carbon atoms substituted or unsubstituted with halogen or an alkyl group having 1 to 5 carbon atoms; an cycloalkylene oxide having 4 to 20 carbon atoms substituted or unsubstituted with halogen or an alkyl group having 1 to 5 carbon atoms; and a styrene oxide having 8 to 20 carbon atoms substituted or unsubstituted with halogen or an alkyl group having 1 to 5 carbon atoms may be used. Typically, as the epoxide, an alkylene oxide having 2 to 20 carbon atoms substituted or unsubstituted with halogen or an alkyl group having 1 to 5 carbon atoms may be used.

Specific examples of such epoxides include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-oxtene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornene, limonene oxide, dieldrin, 2,3-epoxypropylbenzene, styrene oxide, phenyl propylene oxide, stilbene oxide, chlorostilbene oxide, dichlorostilbene oxide, 1,2-epoxy-3-penoxypropane, benzyl oxymethyl oxilane, glycidyl-methylphenyl ether, chlorophenyl-2,3-epoxypropyl ether, epoxypropyl methoxyphenyl ether, biphenyl glycidyl ether, glycidyl naphthyl ether, or the like. Most representatively, ethylene oxide may be used as the epoxide.

In addition, the solution polymerization may be performed for about 1 hour to 60 hours at a temperature of about 50 to 90° C. and a pressure of about 15 to 50 bar. Under the above conditions, the polymerization reaction promoted by the organozinc-supported catalyst according to one embodiment may be effectively performed.

On the other hand, in the method for preparing a polyalkylene carbonate resin of one embodiment, the organozinc-supported catalyst may further include the steps of sufficiently washing a catalyst or a reactor containing the catalyst with a solvent after polymerization and then storing the catalyst in the solvent such that the catalyst is not dried. Accordingly, the stored organozinc-supported catalyst may be reused in the subsequent polymerization, and specifically, the stored organozinc-supported catalyst may be repeatedly used three or more times.

The remaining polymerization processes and conditions except for the above depends on conventional polymerization conditions or the like for preparing a polyalkylene carbonate resin, so that an additional description thereof will not be provided herein.

Advantageous Effects

The organozinc-supported catalyst provided by the present invention may be used repeatedly or continuously while exhibiting improved selectivity in the polymerization process for preparing a polyalkylene carbonate resin. Further, a separate catalyst removal process is not required in the polymerization process, thus being advantageous in view of cost and energy saving.

MODE FOR CARRYING OUT THE INVENTION

Hereinafter, preferred embodiments are provided to allow for a clearer understanding of the present invention. However, the following examples are intended to illustrate the invention, but the invention is not limited thereto.

In addition, the starting materials of the respective examples were used by being purchased from Sigma-Aldrich company as a known compound.

(Production od Catalyst)

EXAMPLE 1

Production of Zinc Glutarate (ZnGA)-Supported Catalyst

Zinc oxide was sputter deposited on a plate-like $SiO_2$ substrate having a size of 2×2 cm to form zinc oxide layer having a thickness of about 400 nm.

Next, in a 100 ml capacity agitable reactor, the $SiO_2$ substrate on which the zinc oxide is formed, 5 g (37.8 mmol) of glutaric acid, and 60 g (651 mmol) of toluene were added. Then, the reaction was performed with stirring for 3 hours by heating to 55° C. and then for 3 hours by heating to 110° C. The reactor was cooled to room temperature, washed with acetone, and then dried in a vacuum oven at 130° C., thus having obtained a ZnGA-supported catalyst in which a zinc ZnGA catalyst is supported on the zinc oxide layer.

COMPARATIVE EXAMPLE 1

Production of Powdery ZnGA Catalyst

In a 250 ml round bottom flask, 13.12 g (100 mmol) of glutaric acid was dispersed in 150 ml of toluene under reflux and heated at 55° C. for 30 minutes.

Separately, 8.14 g (100 mmol) of ZnO was added to 150 ml of toluene and stirred to prepare a ZnO dispersion.

The ZnO dispersion was divided into four based on the volume, and 1/4 of the ZnO dispersion was first added to the glutaric acid solution to conduct the reaction. After one hour, another 1/4 of the ZnO dispersion was added to conduct the reaction. One hour later, another 1/4 of the ZnO dispersion was added to conduct the reaction. After 1 hour, the last 1/4 of the ZnO dispersion was added to perform the reaction. The mixed solution reacted at 55° C., then was heated to 110° C. and heated for 3 hours, thus having removed water generated during synthesis by using Dean Stark. When a white solid is generated, the white solid is filtered, washed with acetone and ethanol, and then dried in a vacuum oven at 130° C. As a result, a powdery organic zinc catalyst (Zn-based catalyst) was obtained.

EXPERIMENTAL EXAMPLE 1

Cross-Section Analysis of ZnGA-Supported Catalyst

In order to analyze the cross section of the ZnGA-supported catalyst produced in Example 1, an $SiO_2$ substrate on which zinc oxide was formed and a ZnGA-supported catalyst before and after polymerization were observed by using a scanning electron microscope (SEM).

Figure 3:
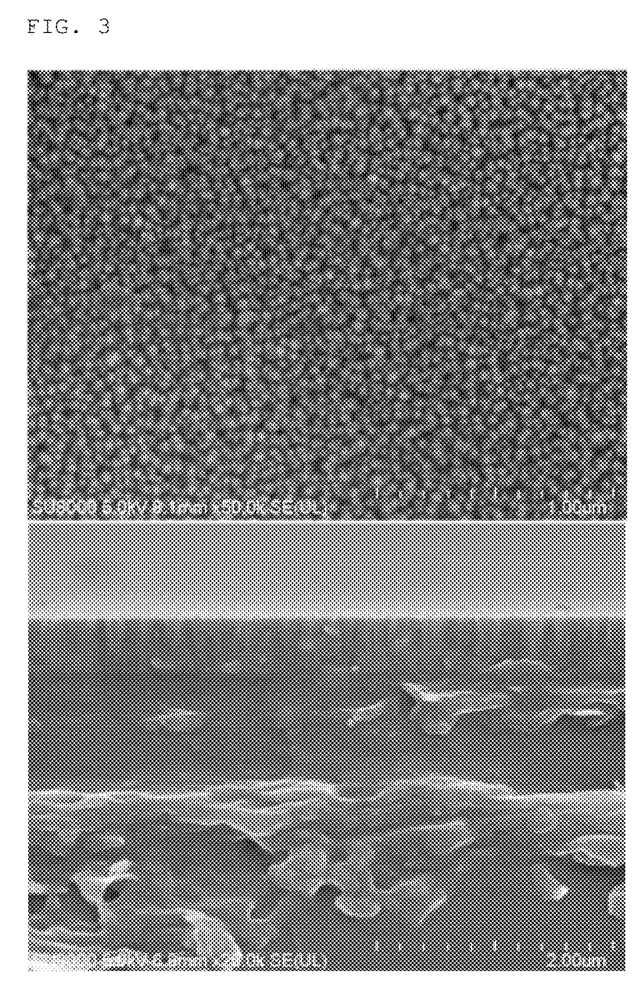
FIG. 3 is an SEM image showing the surface (upper), and the cross section (lower) cut in the longitudinal direction of the $SiO_2$ substrate on which the zinc oxide layer produced in Example 1 is formed.

The upper part of FIG. 3 shows an SEM image of a surface of the $SiO_2$ substrate on which the zinc oxide is formed, that is, the zinc oxide deposition layer, and the lower part of FIG. 3 shows an SEM image of the cross section in which the $SiO_2$ substrate on which the zinc oxide layer is formed is cut in the longitudinal direction.

As shown in FIG. 3, it may be seen that the zinc oxide has a nano-rod shape and a layer having a certain thickness is formed on the entire surface of the $SiO_2$ substrate.

Figure 4:
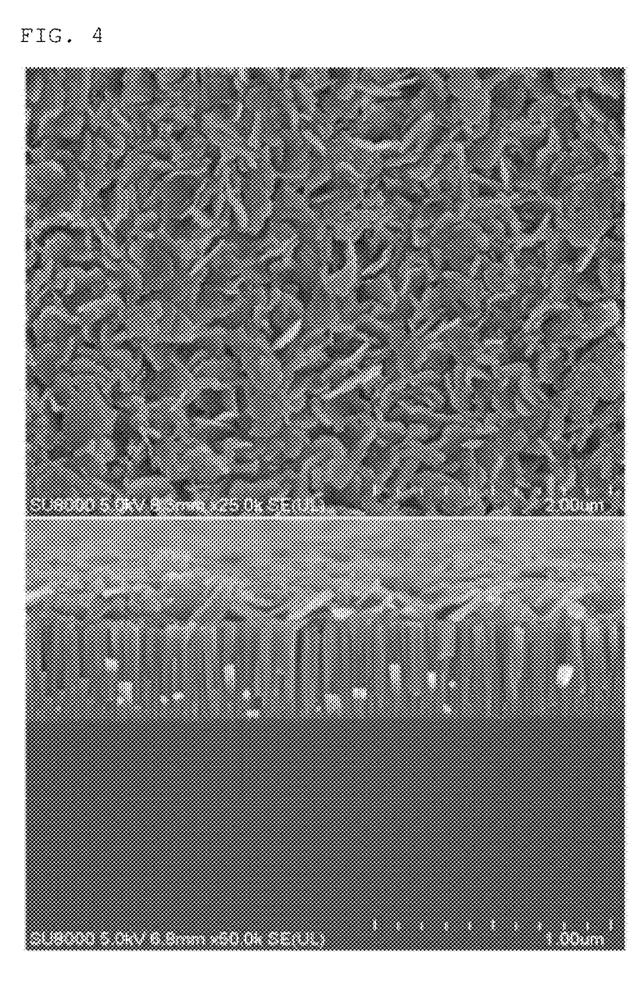
FIG. 4 is an SEM image showing the surface (upper), and the cross section (lower) cut in the longitudinal direction of the organozinc-supported catalyst produced in Example 1 before polymerization.
Figure 5:
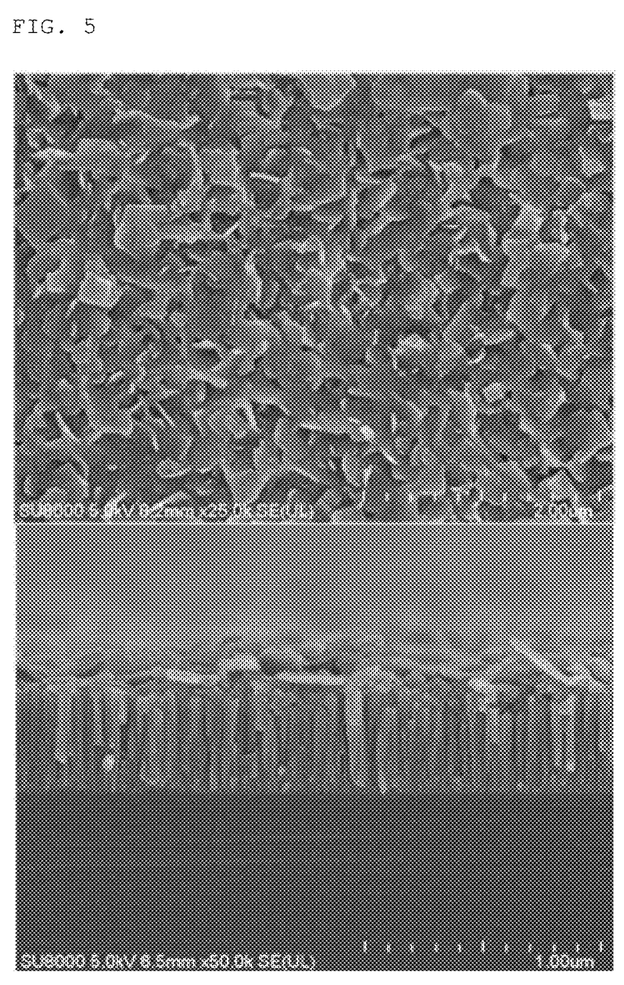
FIG. 5 is an SEM image showing the surface (upper), and the cross section (lower) cut in the longitudinal direction of the organozinc-supported catalyst produced in Example 1 after polymerization.

The upper parts of FIGS. 4 and 5 show SEM images of the surface of the ZnGA-supported catalyst before and after polymerization, that is, the ZnGA catalyst, and the lower part of FIGS. 4 and 5 show SEM images of the cross section in which the ZnGA-supported catalyst is cut in the longitudinal direction before and after polymerization.

As shown in FIG. 4, it may be seen that the ZnGA-supported catalyst has a flake shape, and is supported on the zinc oxide while forming a thin film. In addition, the portion of the zinc oxide layer on the side of the $SiO_2$ substrate is still present even after the catalyst is supported, so that it may be seen that the reaction of the zinc oxide with the glutaric acid is performed only on the surface portion having a certain thickness of the zinc oxide.

In addition, as shown in FIG. 5, It may be seen that the ZnGA-supported catalyst is hardly detached from the surface even after polymerization and most thereof are kept in the state supported on the zinc oxide layer. Accordingly, it may be ascertained that the ZnGA-supported catalyst may be reused repeatedly.

Polymerization of Polyethylene Carbonate (PEC)

EXAMPLE 2

PEC Polymerization Using ZnGA-Supported Catalyst

Polyethylene carbonate was polymerized and prepared by the following method using a ZnGA-supported catalyst produced in Example 1. First, dichloromethane (MC) and ethylene oxide (EO) to be used in the polymerization were sufficiently purified using a molecular sieve, and the moisture amount of the reaction mixture was adjusted to 15 ppm or less before the reaction. Next, in a glove box, 1 mg (measured by substitute weight change before and after the catalyst synthesis reaction) of ZnGA-supported catalyst produced in Example 1, 8.5 g of dichloromethane (MC), and 8.5 g of ethylene oxide (EO) were placed into an autoclave reactor equipped with an agitator. Thereafter, $CO_2$ was added into the reactor and the solution polymerization reaction was performed while bring pressurized at 30 bar, and the reaction was carried out for 3 hours at 70° C. After completion of the reaction, the unreacted $CO_2$, EO, and MC were removed by a venting method. Subsequently, the product was dried to obtain polyethylene carbonate.

COMPARATIVE EXAMPLE 2

PEC Polymerization Using Powdery ZnGA Catalyst

Polyethylene carbonate was obtained by using the same manner as in Example 2, except that the powdery ZnGA catalyst produced in Comparative Example 1 was used instead of the ZnGA-supported catalyst produced in Example 1.

Repeat Polymerization of Polyethylene Carbonate (PEC)

EXAMPLE 3-1

$1^{st}$ PEC Polymerization

Polyethylene carbonate was obtained by using the same manner as in Example 2, except that the polymerization reaction time was changed to 24 hours. After the polymerization, a ZnGA-supported catalyst was recovered, washed with MC, and then stored under MC conditions so as to avoid drying.

In this case, the amount of PEC prepared by the polymerization was 140 mg.

EXAMPLE 3-2

2$^{nd}$ PEC Polymerization

The polymerization was carried out as in Example 3-1 by using the ZnGA-supported catalyst stored under MC conditions to obtain polyethylene carbonate after the polyethylene carbonate of Example 3-1 was prepared. After the polymerization, the ZnGA was recovered, washed with MC, and then stored under MC conditions so as to avoid drying.

In this case, the amount of PEC generated by the polymerization was 120 mg.

EXAMPLE 3-3

3$^{rd}$ PEC Polymerization

Except that the polymerization reaction time was changed to 72 hours by using the ZnGA-supported catalyst stored under MC conditions after the polyethylene carbonate of Example 3-2 was prepared, the polymerization was carried out as in Example 3-1 to obtain polyethylene. After the polymerization, the ZnGA was recovered, washed with MC, and then stored under MC conditions so as to avoid drying.

In this case, the amount of PEC prepared by the polymerization was 530 mg.

The synthesis conditions and synthesis results of PEC in Example 2, Examples 3-1 to 3-3 were shown in Table 1 below.

TABLE 1

|  | Comparative Example 2 | Example 2 | Example 3-1 | Example 3-2 | Example 3-3 |
|---|---|---|---|---|---|
| Catalyst (mg) | 200 | 1 | 1 | 1 | 1 |
| EO (g) | 8.5 | 8.5 | 8.5 | 8.5 | 8.5 |
| MC (g) | 8.5 | 8.5 | 8.5 | 8.5 | 8.5 |
| CO$_2$ (bar) | 30 | 30 | 30 | 30 | 30 |
| EO/catalyst | 53230 | 53230 | 53230 | 53230 | 53230 |
| Reaction temperature (° C.) | 70 | 70 | 70 | 70 | 70 |
| Reaction time (hr) | 3 | 3 | 24 | 24 | 72 |
| PEC yield (mg) | 4500 | 25 | 140 | 120 | 530 |
| PEC yield versus catalyst (g-polymer/g-catalyst) | 22.5 | 25 | 140 | 120 | 530 |
| Catalyst activity (g-polymer/g-catalyst · hr) | 7.5 | 8.33 | 5.83 | 5 | 7.36 |

Referring to Table 1, when the results of the PEC polymerization of Example 2 using the ZnGA-supported catalyst produced in Example 1 and the PEC polymerization of comparative Example 2 using the powdery ZnGA catalyst of Comparative Example 1 were compared, it may be seen that the ZnGA-supported catalyst produced in Example 1 is superior to the powdery ZnGA catalyst of Comparative Example 1 in PEC yield and catalyst activity.

In addition, it was ascertained that even when the organozinc-supported catalyst recovered after the polymerization in Example 3-1 was repeatedly used in Examples 3-2 and 3-3, the catalyst activity is hardly lowered. As a result, it was ascertained that the organozinc-supported catalyst according to the present invention was capable of being reused repeatedly.

EXPERIMENTAL EXAMPLE 2

XRD Analysis of ZnGA-Supported Catalyst Before and After PEC Polymerization

In order to check whether or not the structure of the ZnGA-supported catalyst produced in Example 1 was deformed before and after PEC polymerization, the X-ray diffraction (XRD) analysis was performed for each of the powdery ZnGA catalyst (powder ZnGA, 11) of Comparative Example 1, the zinc oxide layer (thin-film ZnO, 12) on the SiO$_2$ substrate, the ZnGA-supported catalyst (thin-film ZnGA, 13) produced in Example 1, and the ZnGA-supported catalyst (ZnGA after the polymerization, 14) produced in Example 1 recovered after being used in the polymerization. The results thereof were shown in FIG. 6.

Figure 6:
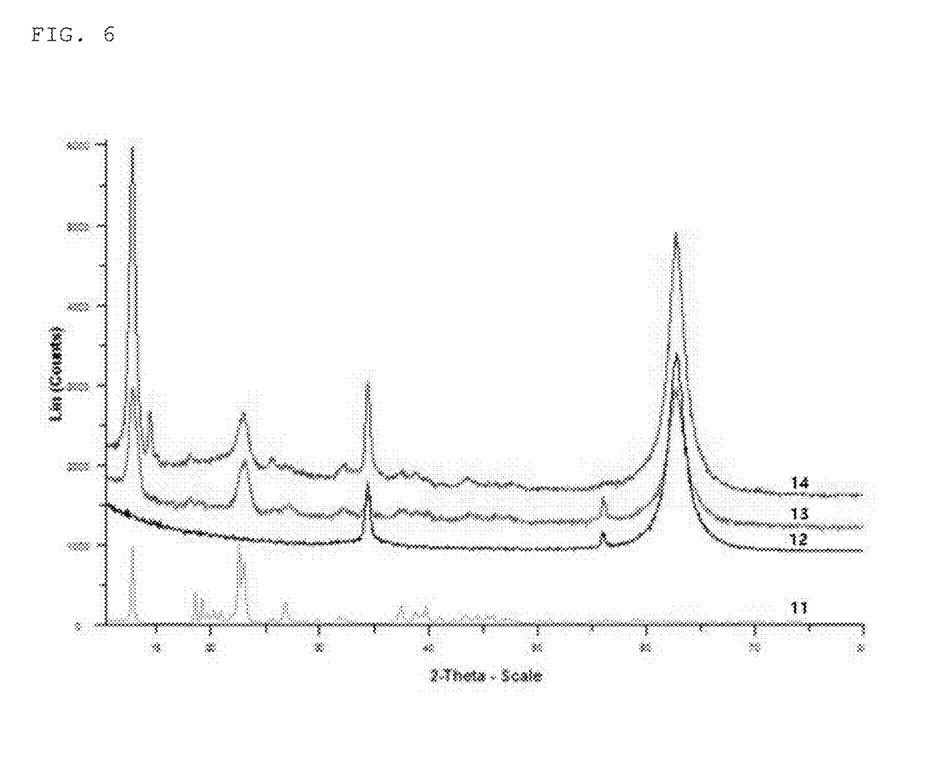
FIG. 6 is a graph showing the X-ray diffraction analysis spectrum of the zinc glutarate powdery catalyst (powdery ZnGA) produced in Comparative Example 1, the zinc oxide layer (thin-film ZnO) on the $SiO_2$ substrate, the zinc glutarate-supported catalyst (thin-film ZnGA) produced in Example 1, and the zinc glutarate-supported catalyst (ZnGA after polymerization) produced in Example 1 recovered after polymerization.

Referring to FIG. 6, the ZnGA-supported catalyst (thin-film ZnGA) produced in Example 1 has peaks with respect to the crystal plane (002) and the crystal plane (103) due to zinc oxide in addition to the peak due to ZnGA, so that it is ascertained that the ZnO layer remains even after synthesis of the ZnGA catalyst. The peak due to the zinc oxide is not present in the XRD peak of the powdery ZnGA catalyst produced in comparative Example 1. This is because when the catalyst was produced in the method of Comparative Example 1, the entire amount of the ZnO was involved in the catalyst synthesis reaction as a zinc precursor to remain hardly in the final product.

In addition, it is ascertained that the ZnGA-supported catalyst produced in Example 1 exhibits the same XRD peak as before used in the polymerization even after used in the PEC polymerization, ZnGA-supported catalyst is hardly detached during the polymerization process. As a result, it is ascertained that the organozinc-supported catalyst according to an embodiment of the present invention may be used repeatedly and continuously, and the catalyst did not remain in the polymerized PEC, so that no separate catalyst removal process was required.

EXPERIMENTAL EXAMPLE 3

Analysis of Physical Properties of Polymerized PEC

In order to compare the physical properties of the PECs prepared in Example 2 and Comparative Example 2, the molecular weight and ingredient of each PEC were analyzed, and the results thereof were shown in Table 2 below. In this case, the molecular weight was measured by using gel permeation chromatography (GPC), and the ingredient analysis was performed by $^1$H NMR.

TABLE 2

|  | Mn (g/mol) | Mw (g/mol) | PDI | PEC ingredient analysis (wt %) |
|---|---|---|---|---|
| Example 2 | 190,000 | 473,000 | 2.48 | 99.2 |
| Comparative Example 2 | 210,000 | 493,000 | 2.34 | 94.5 |

Referring to Table 2, it may be seen that the PEC prepared in Example 2 shows a similar molecular weight and molecular weight distribution to the PEC prepared in Comparative Example 2, and the amount of the PEC ingredient is included much higher. As a result, it may be seen ascertained that in the PEC polymerization process, the ZnGA-supported catalyst produced in Example 1 had more improved selectivity than the powdery catalyst produced in Comparative Example 1. Accordingly, it may be seen that when the ZnGA-supported catalyst is used in the polymerization, the amount of the by-product was remarkably reduced and the efficiency of the entire process was increased.

| [Description of reference numerals] | |
|---|---|
| 1: Support | 2: Zinc compound layer |
| 3: Zinc dicarboxylate-based catalyst | |
| A: Inside catalyst reactor | |
| a: Filter | b: Organozinc-supported catalyst |
| b1: Needle-like organozinc-supported catalyst | |
| b2: Plate-like organozinc-supported catalyst | |
| b3: Spherical organozinc-supported catalyst | |
| 11: Powdery ZnGA | 12: Thin-film ZnO |
| 13: Thin-film ZnGA | 14: ZnGA after polymerization |

The invention claimed is:

1. An organozinc-supported catalyst comprising:
a support;
a zinc compound layer formed on at least a portion of the surface of the support; and
a zinc dicarboxylate-based catalyst supported on the zinc compound layer,
wherein the zinc compound layer has a thickness of 10 to 1000 nm.

2. The organozinc-supported catalyst of claim 1, wherein the support has a needle-like shape, a plate-like shape, or a spherical shape.

3. The organozinc-supported catalyst of claim 1, wherein the support is at least one selected from the group consisting of silica ($SiO_2$), zirconium oxide ($ZrO_2$), aluminum oxide ($Al_2O_3$), magnesium chloride ($MgCl_2$), calcium chloride ($CaCl_2$), magnesium oxide (MgO), titanium oxide ($TiO_2$), boron oxide ($B_2O_3$), calcium oxide (CaO), barium oxide (BaO), thorium oxide ($ThO_2$), stainless steel, and silicon carbide (SiC).

4. The organozinc-supported catalyst of claim 1, wherein the zinc compound is at least one selected from the group consisting of zinc oxide (ZnO), zinc sulfate ($ZnSO_4$), zinc chlorate ($Zn(ClO_3)_2$), zinc nitrate ($Zn(NO_3)_2$), zinc acetate ($Zn(OAc)_2$), and zinc hydroxide ($Zn(OH)_2$).

5. The organozinc-supported catalyst of claim 1, wherein the zinc compound layer has a structure in which zinc compounds in the form of a nano-rod, a nano-hair, a nano-fiber, a nano-pillar, or a nano-wire are clustered.

6. The organozinc-supported catalyst of claim 1, wherein the zinc dicarboxylate-based catalyst is at least one selected from the group consisting of a zinc malonate-based catalyst, a zinc glutarate-based catalyst, a zinc succinate-based catalyst, a zinc adipate-based catalyst, a zinc terephthalate-based catalyst, a zinc isophthalate-based catalyst, a zinc homophthalate-based catalyst, and a zinc phenylglutarate-based catalyst.

7. The organozinc-supported catalyst of claim 1, wherein the zinc dicarboxylate-based catalyst is supported on the surface of the zinc compound layer in a flake shape.

8. The organozinc-supported catalyst of claim 1, wherein the zinc dicarboxylate-based catalyst forms a thin film having a thickness of 10 to 500 nm.

9. A method for producing an organozinc-supported catalyst according to claim 4, the method comprising:
treating a support with a zinc compound to form a zinc compound layer on at least a portion of the surface of the support; and
reacting the zinc compound with a dicarboxylic acid to support a zinc dicarboxylate-based catalyst on the zinc compound layer.

10. The method of claim 9, wherein the treating the zinc compound is performed by a method of depositing the zinc compound on the surface of the support.

11. The method of claim 9, wherein the treating the zinc compound is performed such that the zinc compound layer has a thickness of 10 to 1000 nm.

12. The method of claim 9, wherein the reacting the zinc compound with the dicarboxylic acid is performed in the presence of at least one solvent selected from the group consisting of toluene, hexane, dimethylformamide, acetone, methanol, ethanol, and water.

13. The method of claim 12, wherein the solvent is added in an amount of 2 to 1000 mol relative to 1 mole of the dicarboxylic acid.

14. The method of claim 9, the reacting the zinc compound with the carboxylic acid is performed for 1 hour to 10 hours at a temperature of 40 to 130° C.

15. The method of claim 9, wherein the reacting the zinc compound with the dicarboxylic acid is performed on the surface of the zinc compound layer.

16. A method for preparing a polyalkylene carbonate resin, the method comprising polymerizing a monomer including an epoxide and carbon dioxide in the presence of an organozinc-supported catalyst according to claim 4.

17. The method of claim 16, wherein the polymerizing the monomer is performed by a solution polymerization in an organic solvent.

18. The method of claim 17, wherein the solvent is added in a weight of 0.1 to 100 times relative to the weight of the epoxide.

19. The method of claim 17, wherein the solution polymerization is performed for 1 hour to 60 hours at a temperature of 50 to 90° C. and a pressure of 15 to 50 bar.

* * * * *